United States Patent
Xavier et al.

(10) Patent No.: US 11,469,928 B2
(45) Date of Patent: Oct. 11, 2022

(54) OFFSET CORRECTION IN HIGH-SPEED SERIAL LINK RECEIVERS

(71) Applicant: Texas Instruments Incorporated, Dallas, TX (US)

(72) Inventors: Ani Xavier, Bengaluru (IN); Jagannathan Venkataraman, Bengaluru (IN); Nagalinga Swamy Basayya Aremallapur, Ranebennur (IN); Aviral Singhal, Bengaluru (IN); Arun Mohan, Bangalore (IN); Rakesh Chikkanayakanahalli Manjunath, Bangalore (IN); Aravind Ganesan, Bangalore (IN); Harshavardhan Adepu, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/363,855

(22) Filed: Jun. 30, 2021

(65) Prior Publication Data
US 2022/0182266 A1    Jun. 9, 2022

(30) Foreign Application Priority Data
Dec. 9, 2020   (IN) .............................. 202041053745

(51) Int. Cl.
    H04L 25/06    (2006.01)
    H04L 25/03    (2006.01)
    H04L 25/02    (2006.01)

(52) U.S. Cl.
    CPC ........ H04L 25/061 (2013.01); H04L 25/0296 (2013.01); H04L 25/03859 (2013.01)

(58) Field of Classification Search
    CPC ............... H04L 25/061; H04L 25/0296; H04L 25/03859
    See application file for complete search history.

(56) References Cited

U.S. PATENT DOCUMENTS 7,034,729 B2   4/2006   Gaggl et al.
7,245,686 B2   7/2007   Weiss et al.
(Continued)

OTHER PUBLICATIONS

International Search Report in PCT Application No. PCT/US2021/032681 dated Aug. 19, 2021 (2 pages).
(Continued)

*Primary Examiner* — Janice N Tieu
(74) *Attorney, Agent, or Firm* — John R. Pessetto; Charles A. Brill; Frank D. Cimino

(57) ABSTRACT

A receiver circuit comprising an equalizer and a method of correcting offset in the equalizer. In an example, the equalizer includes a plurality of delay stages for sampling and storing a sequence input samples, and a plurality of coefficient gain stages, each coupled to a corresponding delay stage to apply a gain corresponding to a coefficient value. The outputs of the coefficient gain stages are summed to produce a weighted sum for quantization by a slicer. Offset correction circuitry is provided, including memory storing a look-up table (LUT) for each coefficient gain stage, each storing offset correction values corresponding to the available coefficient values for the coefficient gain stage. Addressing circuitry retrieves the offset correction values for the coefficient values currently selected for each gain stage, and applies an offset correction corresponding to the sum of the retrieved offset correction values.

18 Claims, 9 Drawing Sheets

(56) References Cited

U.S. PATENT DOCUMENTS

| | | | |
|---|---|---|---|
| 7,406,121 | B2 | 7/2008 | Shirani |
| 7,421,022 | B2* | 9/2008 | Choudhary ......... H04L 25/0307 |
| | | | 375/232 |
| 7,782,935 | B1* | 8/2010 | Wong ................ H04L 25/03878 |
| | | | 375/232 |
| 3,054,876 | A1 | 11/2011 | Tsai |
| 8,737,491 | B1* | 5/2014 | Wilson .............. H04L 25/03343 |
| | | | 375/244 |
| 10,298,420 | B1* | 5/2019 | Chada ............... H04L 25/03025 |
| 11,063,793 | B1 | 7/2021 | Xavier et al. |
| 2003/0081669 | A1* | 5/2003 | Yousef ............. H04L 25/03057 |
| | | | 375/233 |
| 2007/0133671 | A1* | 6/2007 | Tsai ....................... H03H 11/26 |
| | | | 375/233 |
| 2008/0159415 | A1 | 7/2008 | Miller et al. |
| 2011/0150071 | A1* | 6/2011 | Takatori ............ H04L 25/03057 |
| | | | 375/232 |
| 2011/0317752 | A1* | 12/2011 | Born ................... H04L 25/0307 |
| | | | 375/232 |
| 2012/0027074 | A1 | 2/2012 | Raghavan et al. |
| 2016/0105195 | A1 | 4/2016 | Mulder |
| 2018/0248577 | A1 | 8/2018 | Hossain et al. |
| 2018/0262374 | A1* | 9/2018 | Cheng ................. H03F 3/45201 |
| 2021/0044461 | A1* | 2/2021 | Groen ............... H04L 25/03057 |

OTHER PUBLICATIONS

U.S. Appl. No. 16/876,308, filed May 18, 2020, entitled "Serial Receiver Equalization Circuit".

Raja et al., "16-bit Segmented Type Current Steering DAC for Video Applications", 19th Int'l Conf. on VLSI Design (IEEE, 2006).

Ajanya et al., "Thermometer Code to Binary code Converter for Flash ADC—A review", Int'l Conf. on Control, Power, Communication and Computing Technologies (IEEE, 2018), pp. 502-505.

Chen et al., "A 60-GB/s PAM4 Wireline Receiver With 2-Tap Direct Decision Feedback Equalization Employing Track-and-Regenerate Slicers in 28-nm CMOS", J. Solid State Circ., vol. 56, No. 3 (IEEE, Mar. 2021), pp. 750-762.

\* cited by examiner

OFFSET CORRECTION IN HIGH-SPEED SERIAL LINK RECEIVERS

CROSS-REFERENCE TO RELATED APPLICATIONS

This application claims, under 35 U.S.C. § 119, the benefit of and priority to Indian Provisional Application No. 202041053745 filed Dec. 9, 2020, which is hereby fully incorporated herein by reference.

BACKGROUND OF THE INVENTION

This relates to the field of data communication, and is more specifically directed to signal conditioning in high-speed serial data communication.

High data rate network and telecommunication systems are now commonplace, with data rates increasing into the tens and hundreds of gigahertz for modern "5G" telecommunication and Ethernet networks, respectively. These high data rates are now commonly supported in and between network nodes and within the network infrastructure itself by high-speed serial communication links operating at frequencies well into the radio frequency (RF) domain. Both wireless and wired communications facilities behave as lossy channels at RF frequencies, necessitating the use of signal conditioning to compensate for such non-ideal effects as frequency-dependent attenuation, inter-symbol interference, jitter, and channel distortion. Indeed, to attain the necessary signal-to-noise ratios for more complex modulation schemes at these high frequencies, signal conditioning has proven necessary for communication links over coaxial or other cabling, or even printed circuit board traces.

To address these issues, equalizers are commonly implemented along the high-speed serial links, such as in the receive path at network endpoints in high-speed Ethernet and wireless telecommunications networks and infrastructure. Other applications such as artificial intelligence (AI) processors, network processors, and the like may also incorporate equalizers in their signal paths. Additionally, some networks include retimers, such as the DS250DF810 retimer available from Texas Instruments Incorporated, that include adaptive analog (continuous time) and digital (discrete time) equalizers that process received signals to correct signal integrity issues and then transmit the conditioned signal along the communications link.

Channel conditions in the communication link are determined by physical channel characteristics, such as the transmission path length and the physical construction and materials of the communications medium. At the establishment of a communications link, receivers and retimers operate to adapt implemented equalizers according to the characteristics of the transmitter and of the dispersive transmission channel between the source transmitter and the receiving node. Typically, adaptation of these equalizers in the receiver path is performed in an "auto-tuned" manner to accommodate channel conditions as of the time of link establishment. In addition, channel conditions can also depend on characteristics that vary over time and environmental conditions. These channel variations include relatively slow changes over time, such as temperature changes and low frequency jitter, but can also include more dynamic changes, such as time-varying interference levels, data multiplexer changes, and the like. Updating of equalizer adaptation after link establishment is thus also desirable.

BRIEF SUMMARY OF THE INVENTION

According to one aspect, a receiver circuit comprising an equalizer is provided, where the equalizer includes a plurality of delay stages for sampling and storing a sequence input samples, and a plurality of coefficient gain stages, each associated with and having an input coupled to a corresponding delay stage. The coefficient gain stages are arranged as differential amplifiers that apply a gain corresponding to a coefficient value, and the outputs of the coefficient gain stages are summed to produce a weighted sum for quantization by a slicer. Offset correction circuitry is provided, including memory storing a look-up table (LUT) for each coefficient gain stage. Each LUT stores offset correction values corresponding to the available coefficient values for the coefficient gain stage. Addressing circuitry retrieves the offset correction values for the coefficient values currently selected for each gain stage, and applies an offset correction corresponding to the sum of the retrieved offset correction values to the weighted sum.

According to another aspect, a method of correcting offset in an equalizer including a plurality of delay stages storing a sequence of input samples, a plurality of coefficient gain stages associated with corresponding ones of the plurality of delay stages and comprising a plurality of differential amplifiers selectable responsive to a selected coefficient value, and a summing circuit summing the output of the differential amplifiers, is provided. Offset correction values stored in memory in association with the selected coefficient values for the coefficient gain stages are selected and summed into an offset correction that is applied to the summing circuit.

Technical advantages enabled by the disclosed aspects will be apparent to those of ordinary skill in the art having reference to the following specification together with its drawings.

BRIEF DESCRIPTION OF THE SEVERAL VIEWS OF THE DRAWING

The same reference numbers or other reference designators are used in the drawings to illustrate the same or similar (by function and/or structure) features.

DETAILED DESCRIPTION OF THE INVENTION

One or more embodiments are described in this specification in the context of equalizer circuitry as used in receivers, retimers, and other receive paths for high-speed serial communication technologies, as it is contemplated that implementation of these embodiments is particularly advantageous in such contexts. However, it is also contemplated that aspects of these embodiments may be beneficially applied in other applications for equalizer functions, for example in the receive path of a network node or infrastructure node in other communications applications and using any one of a number of signal modulation schemes, in data transfer paths within individual apparatuses, and in other hardware systems such as artificial intelligence (AI) processors, network processors, and the like. Accordingly, it is to be understood that the following description is provided by way of example only and is not intended to limit the true scope of the claims.

Figure 1:
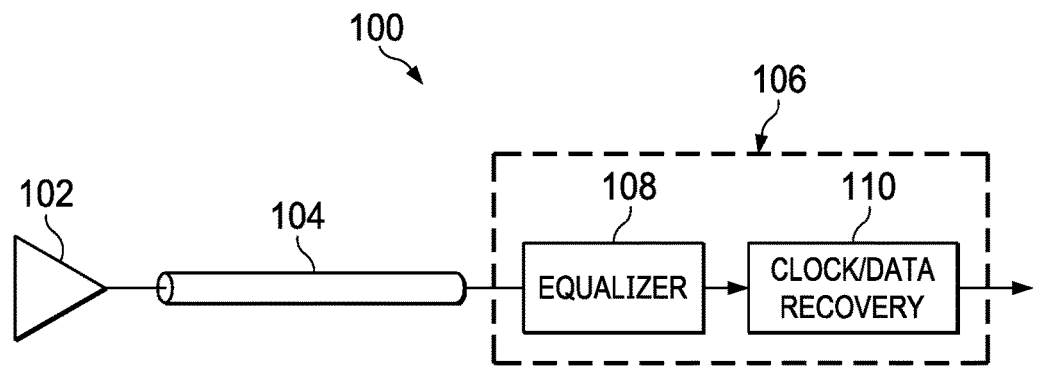
FIG. 1 is an electrical diagram, in block form, of a communications link architecture in which embodiments may be implemented.

FIG. 1 is a block diagram illustrating serial communication system 100, including transmitter 102, channel 104, and receiver 106. In this example, transmitter 102 transmits modulated data signals over channel 104, with such modulation according to a standard scheme, for example four-level pulse amplitude modulation (PAM4) modulation. Channel 104 is an electrically or optically conductive medium, such as may be realized as an optical, coaxial, or other wired communications facility. Receiver 106 performs the function of extracting clock and data signals from the transmissions received via the channel 104 for further transmission or processing.

Non-idealities cause channel 104 to behave as a lossy channel for serial communications between transmitter 102 and receiver 104, particularly in the case of high-speed serial communication using complex modulation schemes such as PAM4. As compared with less complex modulation such as non-return-to-zero (NRZ), PAM4 and other complex modulations provide higher data rate communications but exacerbate the effect of channel distortion due to reduced amplitude of the signals and increased inter-symbol interference, necessitating increasingly tighter receiver specifications. In this example, receiver 106 thus includes equalizer 108 to compensate for distortion in the signal received over lossy channel 104. For example, equalizer 108 can boost high frequency content of the received signal to compensate for attenuation of high frequencies by channel 104. Receiver 106 also includes clock/data recovery circuit 110 to extract clock and data signals from the signals received over channel 104. In some implementations, receiver 106 may be realized as part of a retimer function that performs signal recovery and signal conditioning, such conditioning including equalization to compensate for channel conditions and to reset the jitter "budget."

Figure 2:
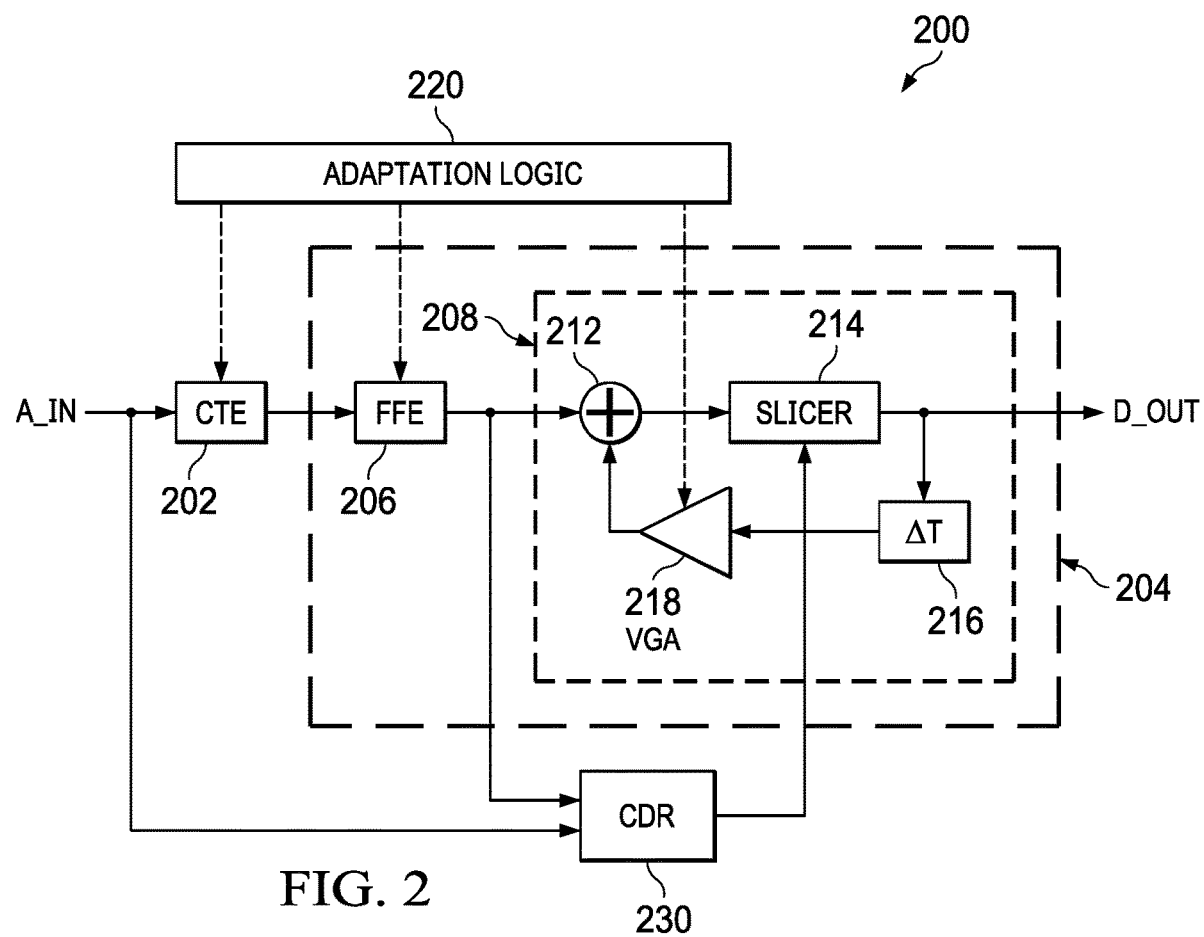
FIG. 2 is an electrical diagram, in block form, of an architecture of a receiver in which embodiments may be implemented.

FIG. 2 illustrates an example of the architecture of receiver 200, according to which receiver 106 in system 100 may be realized according to this disclosure. In the receiver architecture of FIG. 2, signals received by receiver 200 appear at analog input A_IN, which is coupled to an input of continuous time equalizer (CTE) 202. The signals at input A_IN correspond to those received over a communications channel (e.g., channel 104 of FIG. 1) after amplification and initial capacitive coupling and filtering by other input circuitry (not shown) in receiver 200. CTE 202 may be realized as an analog filter, such as a three-stage adaptive analog filter operating as a continuous-time linear equalizer (CTLE), but in these embodiments the equalizer characteristic of CTE 202 need not be linear. In the architecture of FIG. 2, the output of CTE 202 is coupled to an input of discrete-time equalizer (DTE) 204, which in this example includes a combination of feed forward equalizer (FFE) 206 and decision feedback equalizer (DFE) 208. FFE 206 applies a discrete-time filter to the signal from CTE 202, with tap weights selected during adaptation, and applies a filtered discrete time signal to an input of DFE 208.

DFE 208 in this example includes summing circuit 212, which has one input receiving the output of FFE 206, and a second input receiving a feedback signal. Summing circuit 212 applies a sum of the signal from FFE 206 with the feedback signal to an input of slicer 214, which in turn quantizes the output of summing circuit 212 to a digital symbol value presented at digital output D_OUT and forwarded in a digital output stream to the appropriate transmission or processing circuitry of the system function in which receiver 200 is implemented. To perform the decision feedback discrete-time filter function, DFE 208 includes one or more delay stages 216 that receive the symbol at output D_OUT. Variable gain stage 218 applies tap weights to the delayed symbol (e.g., to delayed versions of an error in the quantized symbols) to produce the feedback signal applied to summing circuit 212. Adaptation logic circuitry 220 is provided in receiver 200 to adapt the filter characteristics of CTE 202 and DTE 204 in an auto-tuned manner to accommodate channel conditions, for example according to a least mean squares (LMS) error minimization algorithm to derive the analog filter characteristics of CTE 202 and tap weights for the discrete-time filters used to implement either or both of FFE 206 and DFE 208 in DTE 204.

In this architecture, the combination of CTE 202, FFE 206, and DFE 208 in receiver 200 of FIG. 2 corresponds to equalizer function 108 in receiver 106 of FIG. 1. Receiver 200 in the architecture of FIG. 2 also includes clock/data recovery circuit 220 having inputs coupled to the input of CTE 202 and the input of DFE 208, and an output coupled to slicer 214; clock/data recovery circuit 230 extracts a clock signal from the received serial signals, and in this example controls the time at which slicer 214 quantizes the filtered signal.

According to one or more embodiments, discrete-time equalizer (DTE) 204, which in the example of FIG. 2 includes both FFE 206 and DFE 208, is realized by analog circuitry rather than by digital logic, and thus operates on signals in the analog domain rather than data in the digital domain. This realization of DTE 204 as analog circuitry can avoid the high power dissipation of analog-to-digital converter (ADC) circuitry used to convert analog signals from CTE 202 before application to the DTE, especially for high data rate serial communications, and can often be realized in significantly less semiconductor die area than an equivalent digital implementation. Analog realization of DTE 204 can also avoid quantization effects of the ADC.

Figure 3:
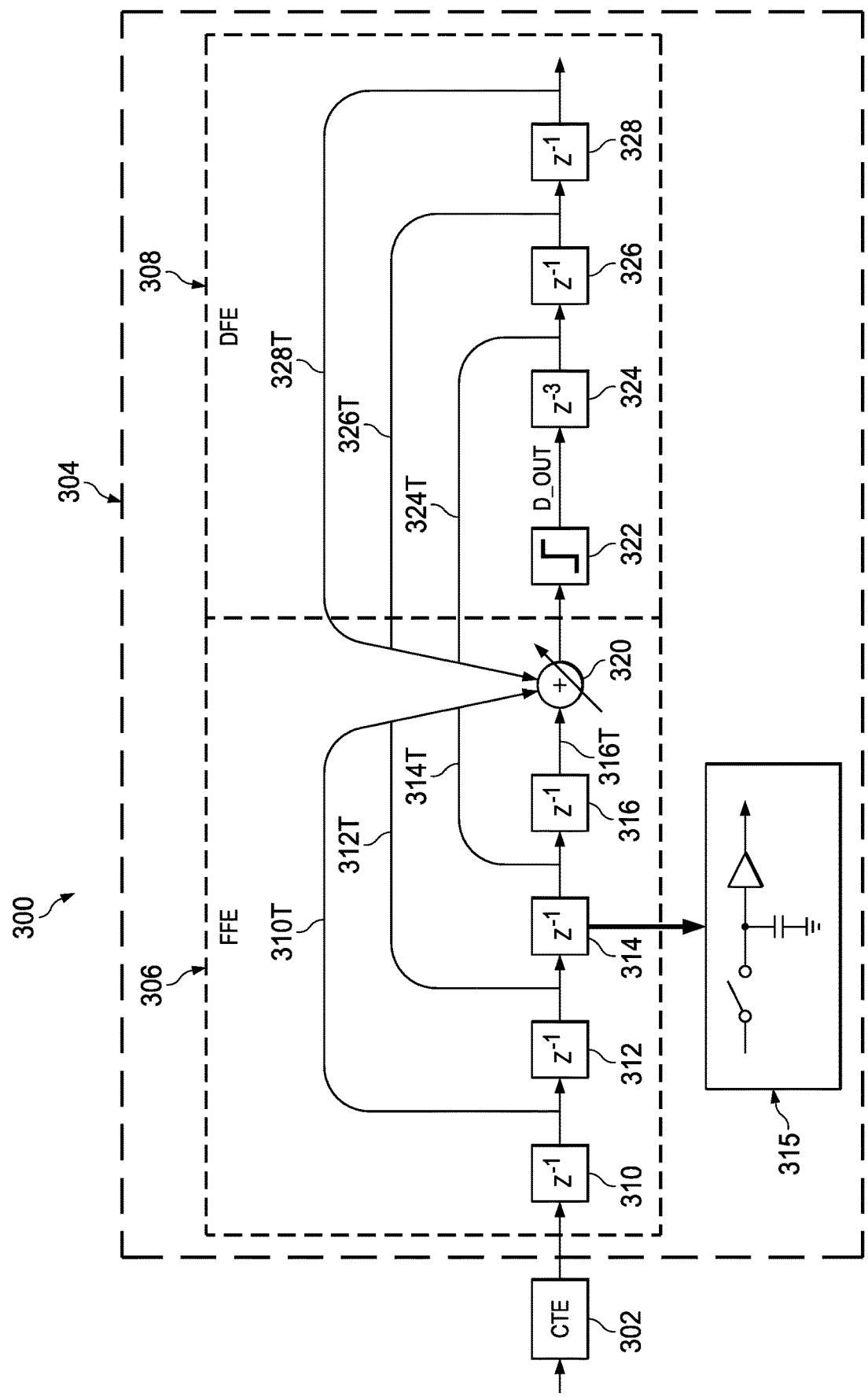
FIG. 3 is an electrical diagram, in block form, of equalization circuitry in the receiver of FIG. 2 according to embodiments.

FIG. 3 schematically illustrates an example of equalization circuit 300 as analog circuitry, as may be used to implement equalizer 200 of FIG. 2 according to this disclosure. As shown in FIG. 3 and as described above, equalization circuit 300 includes continuous-time equalizer circuit (CTE) 302, for example realized as a continuous-time-linear equalizer constructed of analog circuitry and adapted to boost the high frequency content of the received signal.

DTE 304 in equalization circuit 300 also includes FFE circuit 306 and DFE circuit 320. FFE circuit 306 in this example includes delay circuits 310, 312, 314, and 316, and summing amplifier 320. Because FFE circuit 306 is constructed and operates as an analog circuit, delay circuits 310, 312, 314, and 316 are each implemented as instances of a sample and hold circuit 315, an example of which is shown in FIG. 3. Outputs of delay circuits 310, 312, 314, and 316 communicate respective FFE taps 310T, 312T, 314T, and 316T to inputs of variable gain summing amplifier 320. Summing amplifier 320 applies selected gains, also referred to as filter coefficients or "tap weights," to corresponding FFE taps 310T, 312T, 314T, 316T, and sums those weighted taps. While FFE circuit 306 is illustrated in FIG. 3 as having four FFE taps, more or fewer delay circuits and thus taps may alternatively be implemented.

DFE circuit 308 has an input coupled to the output of variable gain summing amplifier 320. As discussed above relative to FIG. 2, DFE circuit 308 includes one or more slicers 322 and one or more delay circuits 324, 326, and 328 in this example. In some implementations of DFE circuit 308, slicers 322 may be implemented using comparators, and delay circuits 224, 226, and 228 may be implemented using flip-flops. Slicers 322 compare the signals at its input to one or more reference voltages to determine bit values of the signals as output by variable gain summing amplifier 320. In this example, outputs of delay circuits 324, 326, and 328 form DFE taps 324T, 326T, and 328T, each of which is coupled as a feedback signal to inputs of variable gain summing amplifier 320 for application of a tap weight, and summation with the weighted tap values from FFE 306.

The construction and operation of equalization circuit 300 as may be used in implementations of one or more embodiments is described in further detail in U.S. application Ser. No. 16/876,308, entitled "Serial Receiver Equalization Circuit," filed May 18, 2020, and fully incorporated herein by this reference.

Figure 4:
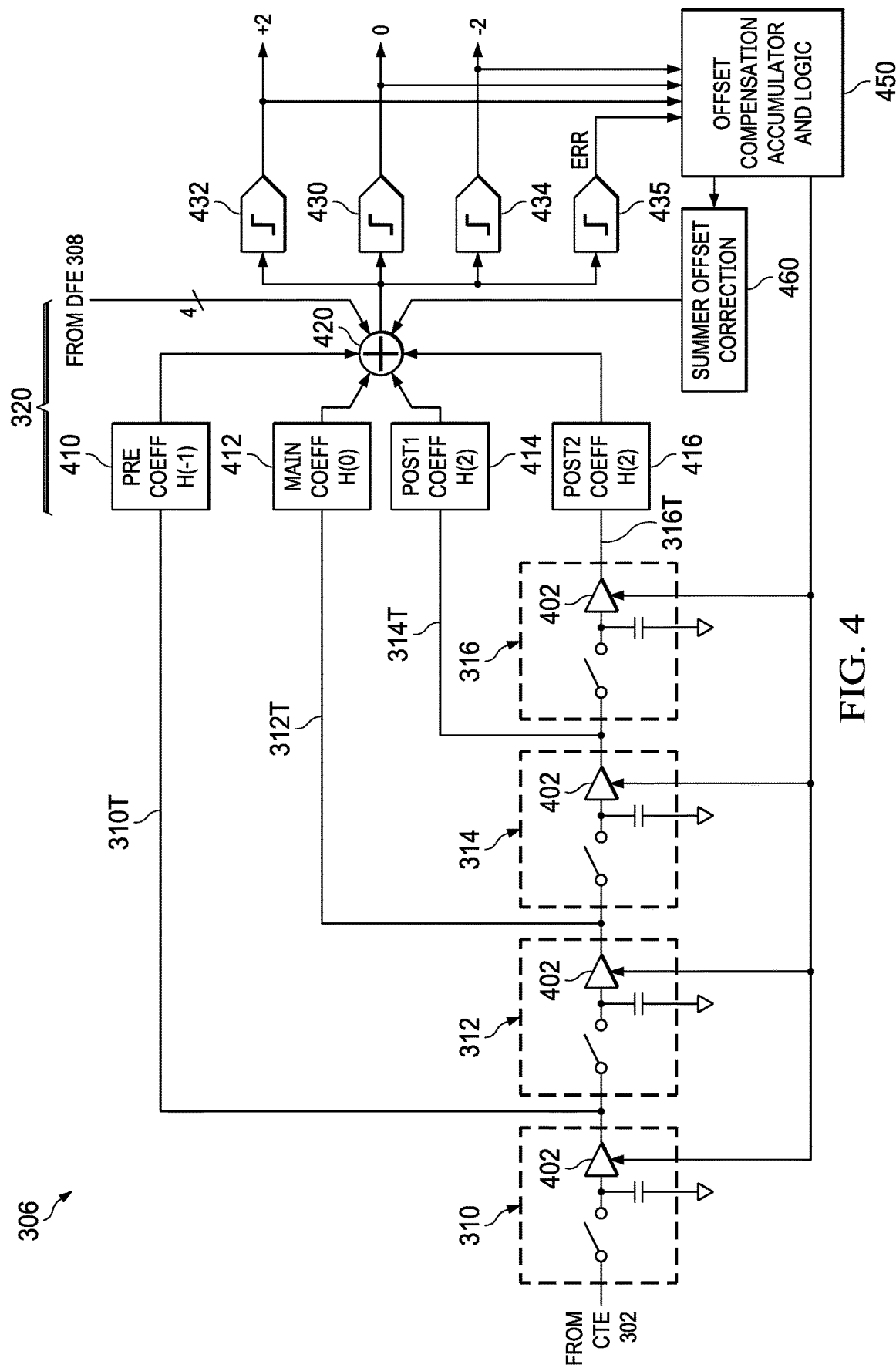
FIG. 4 is an electrical diagram, in block and schematic form, of the functional architecture of a feed-forward equalizer (FFE) in the equalization circuitry of FIG. 3 according to embodiments.

FIG. 4 schematically illustrates the functional architecture of FFE 306 according to an example. In this example in which FFE 306 is realizing a four-tap digital filter, delay circuits 310, 312, 314, 316 store a sequence of samples from the output of CTE 302. As shown in FIG. 4, each delay circuit 310, 312, 314, 316 includes a buffer 402 to store a corresponding sample value. For purposes of nomenclature, this description of FFE 306 as a four-tap filter considers delay circuit 310 as sampling and storing a most recent sample n−1 of the output of CTE 302. Similarly, delay circuit 312 stores the next most previous sample n, delay circuit 314 stores sample n+1, and delay circuit 316 stores sample n+2.

In the four-tap example of FIG. 4, variable gain summing amplifier 320 includes coefficient gain stages 410, 412, 414, 416 and summing circuit 420. Coefficient gain stage 410 receives precursor tap 310T representing precursor sample n−1 from delay stage 310T, coefficient gain stage 412 receives main cursor tap 312T representing main cursor sample n from delay stage 312T, coefficient gain stage 414 receives first post-cursor tap 314T representing first post-cursor sample n+1 from delay stage 314T, and coefficient gain stage 416 receives second post-cursor tap 316T representing post-cursor sample n+2 from delay stage 316T. As will be described below, each of coefficient gain stages 410, 412, 414, 416 amplifies its respective received tap 310T, 312T, 314T, 316T by a gain corresponding to a selected coefficient or tap weight for that tap. According to FFE nomenclature, coefficient gain stage 410 applies coefficient h(−1) to precursor tap 310T representing precursor sample n−1, coefficient gain stage 412 applies coefficient h(0) to precursor tap 312T representing main cursor sample n, coefficient gain stage 414 applies coefficient h(+1) to precursor tap 314T representing first post-cursor sample n+1, and coefficient gain stage 416 applies coefficient h(+2) to second post-cursor tap 316T representing second post-cursor sample n+2. These weighted tap values are applied to inputs of summing circuit 420, which produces a weighted sum of the taps 310T, 312T, 314T, 316T at its output. The tap weights applied by coefficient gain stages 410, 412, 414, 416 are determined during the adaptation of FFE 306 to provide the desired filter characteristic.

The example of FIG. 4 illustrates in architectural detail the generation of a weighted sum from FFE 306. In those implementations in which DTE 302 also includes a DFE 308 (e.g., as in FIG. 3), DFE 308 may apply its weighted tap values (e.g., four such weighted) to summing circuit 420 as suggested in FIG. 4.

In this example, the received serial communication signals are modulated according to PAM4 modulation for transmission of each symbol at one of four amplitudes corresponding to one of four digital values. To resolve a given signal sample after filtering from among these four possible amplitudes, slicer 322 in the example of FIG. 4 is constructed of four comparators 430, 432, 434, and 435. Comparators 430, 432, 434 resolve the weighted sum at the output of summing circuit 420 as to one of four amplitudes representing a corresponding two bit binary value, and comparator 435 determines an error value as will be described. Comparator 430 compares the weighted sum with a "0" reference value (e.g., a reference voltage corresponding to a "0" level) to determine whether it represents a positive value (+1 or +3) or a negative value (−1 or −3). If positive, comparator 432 compares the weighted sum with a "+2" reference value (e.g., a reference voltage corresponding to a "+2" level) to determine whether the weighted sum represents a +1 (binary 11) or +3 (binary 10) value. If negative, comparator 434 compares the weighted sum with a "−2" reference value (e.g., a reference voltage corresponding to a "−2" level) to determine whether the weighted sum represents a −1 (binary 01) or −3 (binary 00) value. Error comparator 435 in this example determines an error value for +3 or −3 weighted sum results, relative to "ideal" +3 and −3 levels, respectively. The results of the comparisons determined by slicer 322 for each weighted sum output from summing circuit 420 are forwarded to a decoder function (not shown) for decoding into the two bit binary values associated with the detected −3, −1, +1, or +3 value.

While the analog implementation of equalization circuit 300 as shown in FIG. 3 and FIG. 4 can provide the benefits of reduced power dissipation and the avoidance of quantization effects, as noted above, offset error in the analog circuitry of FFE 306 has been observed. For example, shifts can appear in the signal levels at the output of summing circuit 420 relative to the expected analog levels for the +−3, +1, −1, and −3 PAM4 values. In this example, because DFE 308 filters quantized and digitized values on output D_OUT from slicer 322, for example using delay stages 324, 326, 328 realized as flip-flops, DFE 308 is not expected to be a significant source of offset. Referring to FIG. 4, investigation has identified sources introducing this offset error as including summing circuit 420 itself, buffers 402 in delay circuits 310, 312, 314, 316, and coefficient gain stages 410, 412, 414, 416.

Figure 5:
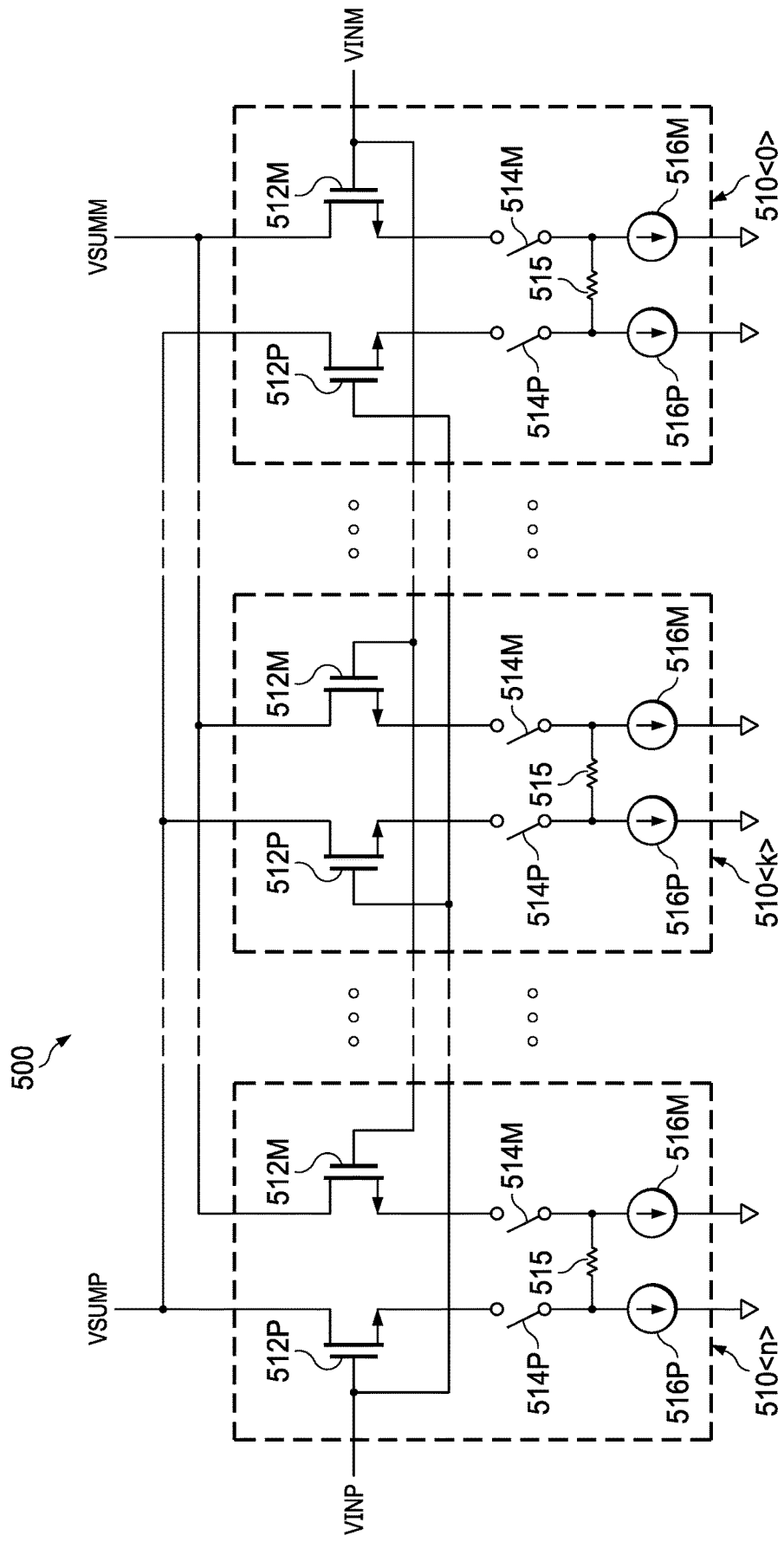
FIG. 5 is an electrical diagram, in schematic form, of a coefficient gain stage in the FFE of FIG. 4 according to an implementation.

For an explanation of offset as introduced by the coefficient gain stages, the construction of an example of coefficient gain stage 500, according to which each of coefficient gain stages 410, 412, 414, 416 may be constructed, is shown in FIG. 5. In this example, the tap signal (i.e., the corresponding one of taps 310T, 312T, 314T, 316T) is in the form of differential signals received by coefficient gain stage 500 on lines VINP, VINM (e.g., VINP as the positive, +, differential line and VINM as the negative, –, differential line). Coefficient gain stage 500 in this example applies a tap weight to the differential tap signal according to a selected combination of differential amplifiers 510, which are ordered in this example from differential amplifier 510<0> at a least significant bit (LSB) position, to differential amplifier 510<n> at a most significant bit (MSB) position. The ordering of differential amplifiers 510<n>, . . . , 510<k>, . . . , 510<0> may be according to a binary or thermometric coding, or by a combination of binary and thermometric coding (e.g., with binary coding of the LSBs and thermometric coding of the MSBs). Individual ones of differential amplifiers 510<n>, . . . , 510<k>, . . . , 510<0> may all have the same gain (e.g., $g_m$) as one another, or alternatively may have different gain (e.g., binary weighted).

Each differential amplifier 510 includes a pair of input transistors 512P, 512M, which are n-channel MOS transistors in this example. Transistor 512P has a source-drain path connected between output line VSUMP and switch 514P, and a gate receiving differential input line VINP. Similarly, transistor 512M has a source-drain path connected between output line VSUMM and switch 514M, and a gate receiving differential input line VINM. Switches 514P, 514M connect the source of transistors 512M, 512P, respectively, to respective current sources 516P, 516M, and when closed select their corresponding differential amplifier for generation of the signal at output liens VSUMP, VSUMM. Degeneration resistor 515 is connected between a node at which switch 514P is connected to current source 516P, and a node at which switch 514M is connected to current source 516M, to improve input linearity.

Output lines VSUMP, VSUMM are connected to the drain nodes of transistors 512P, 512M in each of differential amplifiers 510<n>, . . . , 510<k>, . . . , 510<0>, and are provided to summing circuit 420 (FIG. 4) as one of the weighted tap values to be summed into the filtered signal. The differential signal at output lines VSUMP, VSUMM is thus generated by the differential signal at input lines VINP, VINM amplified by a gain, or tap weight, corresponding to the sum of the transconductances ($g_m$) of those of differential amplifiers 510 having their switches 514P, 514M in a closed state. Those differential amplifiers 510 with open switches 514P, 514M do not contribute to the output signal. Accordingly, the tap weight applied by coefficient gain stage 500 is set by the pattern of which differential amplifiers 510<n>, . . . , 510<k>, . . . , 510<0> are enabled by having their switches 514P, 514M closed. The selection of which pairs of switches 514P, 514M in each coefficient gain stage 500 will generally be determined in the adaptation of FFE 306, for example as performed by adaptation logic 220 (FIG. 2) at establishment of the communications link and as updated during operation as channel conditions change.

Due to circuit and fabrication non-idealities, however, each differential amplifier 510<n>, . . . , 510<k>, . . . , 510<0> in each coefficient gain stage 500 can introduce some amount of offset into its amplification of the differential signal at input lines 512P, 512M. But because the number and selection of differential amplifiers 510<n>, . . . , 510<k>, . . . , 510<0> in each coefficient gain stage 500 varies with the current value of the tap weight, the amount and polarity of offset appearing in the summed differential signal at output lines VSUMP, VSUMM will vary with the values of the tap weights (filter coefficients). Stated another way, each tap weight value, applied by a different combination of differential amplifiers 510, introduces a different offset that will be reflected in the weighted sum at the output of summing circuit 420 applied to slicer 322. This coefficient dependent offset (or "code dependent" offset) changes constantly during operation with varying data and with updates to the tap weights, leading to instantaneous loss in the bit error rate (BER) performance of receiver 200. Furthermore, because this offset is pattern dependent, one cannot readily derive a suitable test pattern for characterizing the BER performance of receiver 200.

As shown in FIG. 4, offset compensation accumulator and logic circuitry 450 and summer offset correction circuitry 460 are provided in combination with DFE 306 and summing circuit 420 to correct for one or more of these sources of offset. Offset compensation accumulator and logic circuitry 450 and summer offset correction circuitry 460 may be implemented as part of adaptation logic 220 or may be implemented as separate logic circuitry, and may be implemented with analog or digital circuitry and/or software, or a combination thereof, arranged and adapted to carry out the functions described in this specification. To the extent that offset compensation accumulator and logic circuitry 450 and summer offset correction circuitry 460 are realized in digital circuitry, such digital circuitry may be implemented as custom or semi-custom logic, application specific logic circuitry or programmable logic, such as a digital signal processor, by general-purpose programmable logic, or a combination of these approaches.

Figure 6:
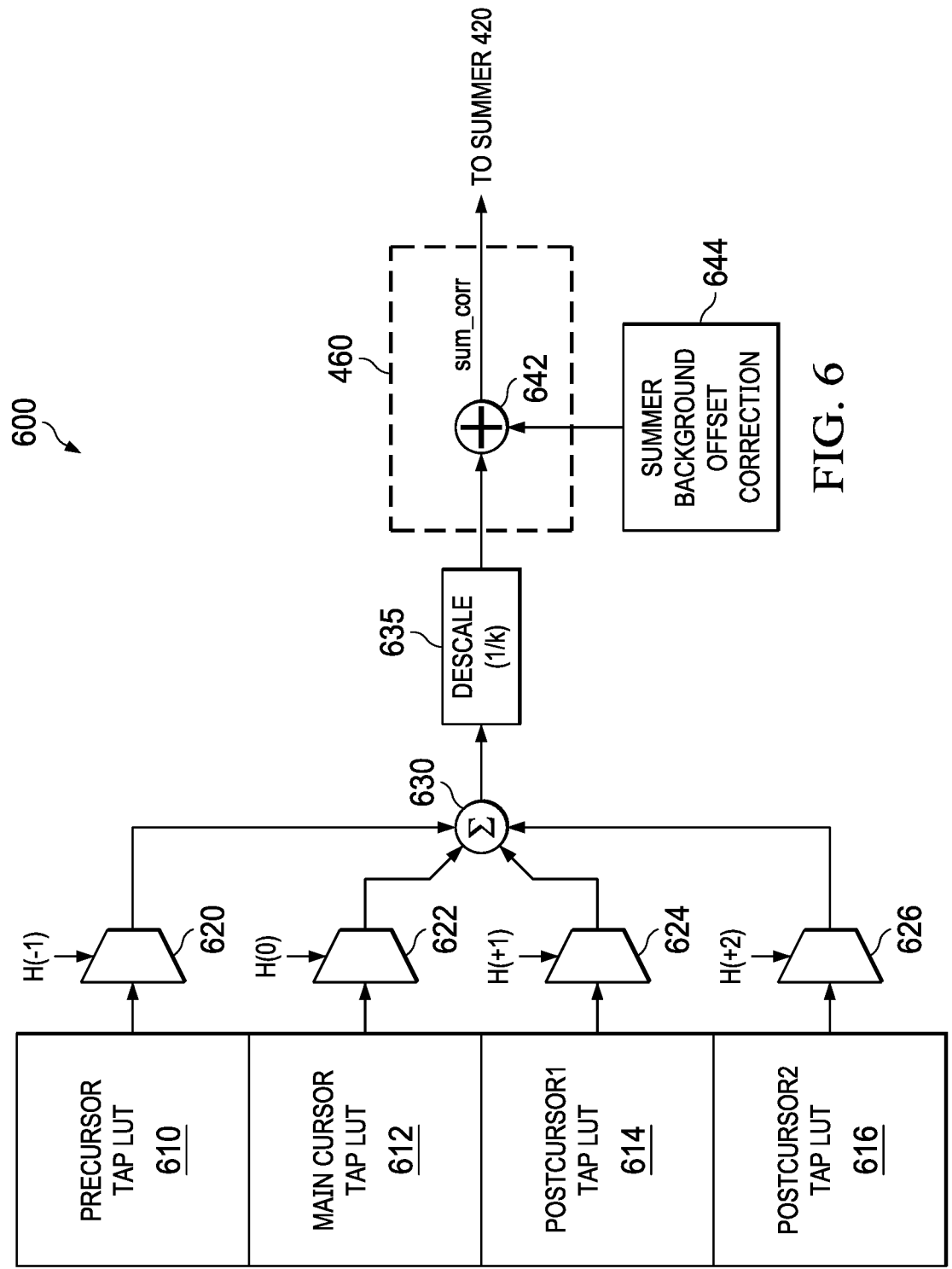
FIG. 6 is an electrical diagram, in block and schematic form, of coefficient offset correction circuitry in the equalization circuitry of FIG. 3 according to embodiments.

FIG. 6 illustrates the construction of coefficient offset correction circuitry 600, which is included in offset compensation accumulator and logic circuitry 450 according to an implementation. Coefficient offset correction circuitry 600 in this example includes memory arranged as one or more look-up tables (LUTs), each associated with one of the taps of FFE 306. In this example, LUT 610 is associated with precursor tap 310T, LUT 612 is associated with main cursor tap 312T, LUT 614 is associated with the first post-cursor tap 314T, and LUT 616 is associated with the second post-cursor tap 316T. The stored contents of LUTs 610, 612, 614, 616 include offset correction values for each available coefficient value that may be applied by its respective coefficient gain stage 410, 412, 414, 416. In the arrangement of FIG. 6, the entries of LUTs 610, 612, 614, 616 are selected by corresponding addressing circuitry 620, 622, 624, 626, respectively, in response to the current coefficient value being applied by FFE 306 for that associated tap. For example, addressing circuitry 620 selects the appropriate entry of precursor LUT 610 in response to the current value of coefficient h(−1) being applied to precursor tap 310T; the other addressing circuitry instances 622, 624, 626 similarly select the appropriate LUT 612, 614, 616 entries in response to their respective coefficients h(0), h(+1), h(+2). The offset corrections from LUTs 610, 612, 614, 616 selected by their corresponding addressing circuitry instances 620, 622, 624, 626 are each applied to a corresponding input of summing circuit 630. Summing circuitry 630 sums the selected offset corrections from LUTs 610, 612, 614, 616 to produce, at its output, a summed correction value for communication to summing circuit 420. This correction value will be added to the sum of weighted tap values 310T, 312T, 314T, 316T to compensate for offset introduced by coefficient gain stages 410, 412, 414, 416.

It is desirable that the summed coefficient-dependent correction value produced by summing circuit 630 from the sum of the coefficient-dependent correction values from LUTs 610, 612, 614, 616 be at the desired range and resolution when applied to summing circuit 420. To accomplish this in the example of the architecture of FIG. 6, the offset correction values stored in LUTs 610, 612, 614, 616 are at a higher resolution by a factor K (e.g., 2 additional bits of resolution, or K=¼) than that desired at the output of summing circuit 630 and that is to be applied by summing circuit 420. For example, if the four LUT coefficient-dependent correction values from LUTs 610, 612, 614, 616 are each expressed at a resolution of 7 bits, the sum of these values at the output of summing circuit 630 will be accurate to 5 bits of precision. To place the summed coefficient-dependent correction value from summing circuit 620 into the desired range, coefficient offset correction circuitry 600 includes a descale function 635 that rescales the summed offset correction value at the output of summing circuit 630 by that scaling factor K (multiplying by 1/K). For the example given above, descale function 635 will multiply the output from summing circuitry by 1/K=4. By performing the descaling by descale function 635 on the summed offset correction at the output of summing circuit 630, the resulting offset estimation and correction can remain at high precision following the addition by summing circuit 630. The descaled summed offset correction value from descale function 635 is then applied to summing circuit 642, which in this case is implemented as part of summer offset correction circuitry 460, for eventual application to summing circuit 420 as an offset correction (e.g., by modulating a bias current or voltage in summing circuit 420).

Alternatively, descale function 635 may be omitted in coefficient offset correction circuitry 600. In this case, appropriate considerations of range and precision of the summed coefficient-dependent corrections as applied to summing circuit 630 should be taken.

Figure 7:
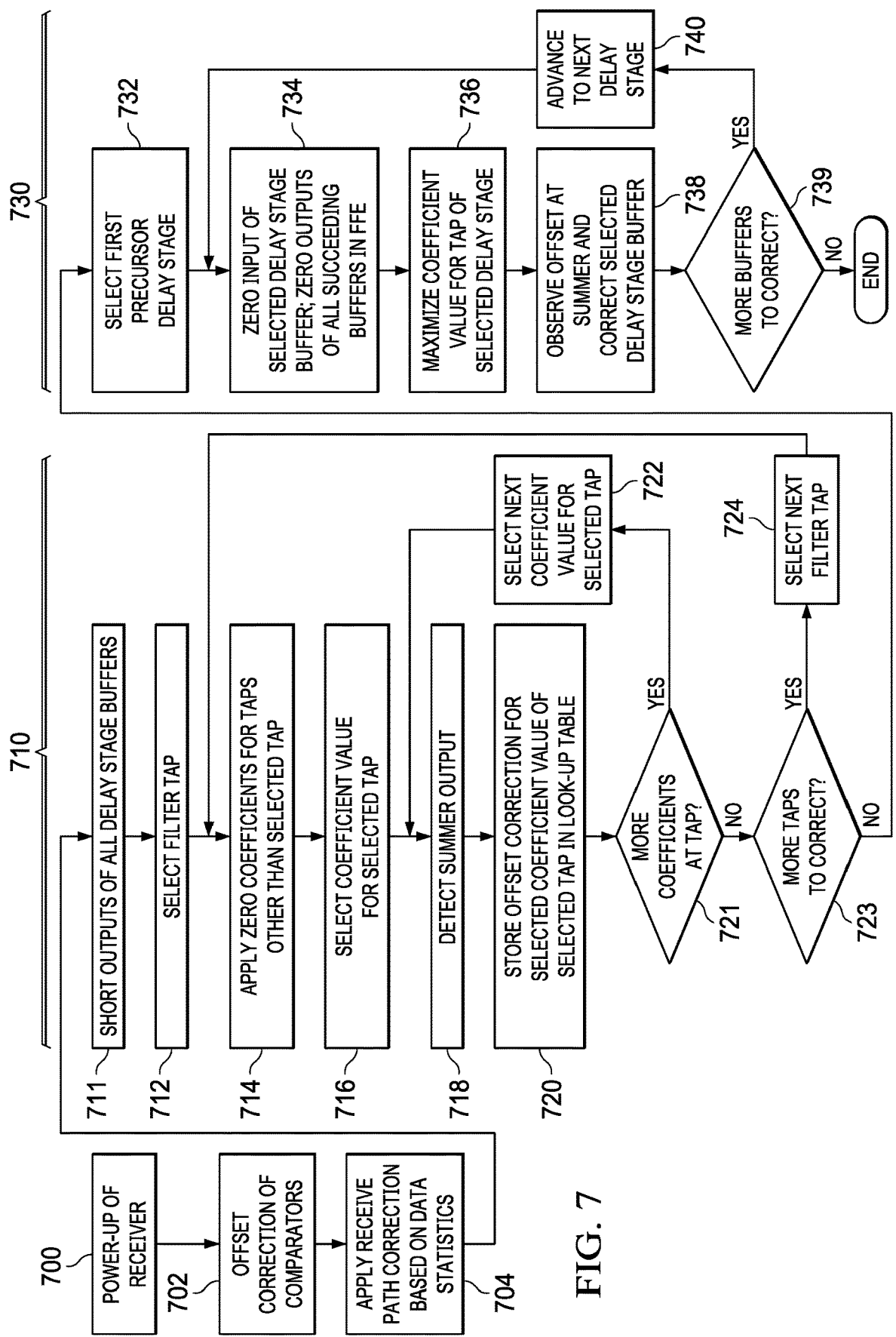
FIG. 7 is a flow diagram illustrating a method of applying offset correction to an FFE according to an implementation.

Referring to FIG. 7, a method of determining and implementing the offset corrections for FFE 304 of receiver 200 according to an implementation will now be described. In this example, offset corrections are determined following a power-up or reset of receiver 200, in process 700; it is to be understood, however, that offset correction as described in this specification may alternatively or additionally be determined during operation of receiver 200, for example to update offset correction values over changes in operational or environmental conditions. It is contemplated that this method of FIG. 7 may be implemented in receiver 200 under the control of control logic such as adaptation logic 222, offset compensation accumulator and logic circuitry 450, or other digital logic implemented in receiver 200. To the extent that this control logic is implemented by programmable logic circuitry, it is contemplated that memory may be provided in receiver 200 to store instructions for performing these operations, such instructions being executable by the programmable logic circuitry of this control logic. Other implementations of the control circuitry in receiver 200 for carrying out these operations described relative to FIG. 7 may alternatively be used.

In this implementation, baseline offset correction in the receive path is performed at power up by way of offset correcting all comparators (e.g., comparators 430, 432, 434, 435 in slicer 322) in process 702. For example, by shorting the differential inputs of each comparator, observing the offset level at its output, and adjusting its bias to correct for the observed offset. Following offset correction of the comparators in process 702, process 704 is then performed to derive an overall correction for the receive path. In one example, receive path offset compensation is based on an assumption that the received data is equipolar, evident by the "0" level comparator 430 detecting an equal number of positive (+1 or +3) and negative (−1 or −3) values. In that example, process 704 can be performed by an accumulator in offset compensation accumulator and logic circuitry 450 monitoring data statistics of some number of processed samples. To the extent that a bias is seen in those statistics toward either positive or negative values, such bias can be assumed due to offset in the receive path, and a corresponding correction applied to summing circuit 420, for example, to compensate for that bias in the data as applied to slicer 322.

These baseline processes 702, 704 provide correction for certain offsets in receiver 200. But neither determines the presence or extent of code-dependent or coefficient-dependent offset as described above, much less provide correction for such error. According to this implementation, coefficient-dependent offset correction process 710 is performed to load the appropriate offset correction values into LUTs 610, 612, 614, 616 for the available coefficient values applied by each tap 310T, 312T, 314T, 316T of FFE 304.

Coefficient-dependent offset correction process 710 begins in process 711, in which the outputs of all delay stage buffers 402 are shorted to apply a zero input at each of taps 310T, 312T, 314T, 316T. In process 712, one of FFE taps 310T, 312T, 314T, 316T is selected. For example, consider tap 310T and corresponding coefficient gain stage 410 as the first tap selected in process 712. In process 714, zero-valued coefficients are applied at all gain stages 412, 414, 416 other than selected coefficient gain stage 410. Because the value of each tap 310T, 312T, 314T, 316T is zero and the coefficients applied by non-selected gain stages 412, 414, 416 are zero, the output of selected coefficient gain stage 410 will be the only potential non-zero input to summing circuit 420. In process 716, one of the coefficient values that may be applied to tap 310T is selected and applied at coefficient gain stage 410.

With the output of coefficient gain stage 410 at the selected coefficient value as the only non-zero contributor to the weighted sum output by summing circuit 420, any offset introduced by coefficient gain stage 410 at that coefficient value can be observed at the output of summing circuit 420 in process 718. For example, detection of this offset in process 718 may be performed by comparator 430, detected as a difference between the output of summing circuit 420 and the "0" reference level. In process 720, an offset correction value that compensates for the offset observed in process 718 is stored in an entry of LUT 610 in association with the coefficient value selected in process 716, and retrievable from LUT 610 upon presentation of that selected coefficient value to addressing circuitry 620. As described above, the offset correction value stored in LUT 610 may be at a higher resolution, by scaling factor K, to ensure the desired resolution of the coefficient-dependent correction as applied to summing circuit 420. Following process 720, the determination of offset correction for the current selected coefficient value of the current tap is complete.

Decision 721 determines whether offset correction is to be performed for any more coefficient values for the selected tap. If so (decision 721 is "yes"), a next coefficient value for that currently selected tap is selected in process 722, and the output of summing circuit 420 is observed for that coefficient value in another instance of process 718. Upon all coefficient values being considered for the currently selected tap (decision 721 is "no"), decision 723 is then executed to determine whether any more taps 310T, 312T, 314T, 316T remain to be corrected. If so (decision 723 is "yes"), another filter tap is selected in process 724, and correction begins for that newly selected tap (e.g., tap 312T) beginning with the shorting of inputs to summing circuit 420 from all other coefficient gain stages (e.g., gain stages 410, 414, 416) other than the newly selected tap.

After offset correction values have been stored in LUTs 610, 612, 614, 616 for all coefficient values for all taps (both decisions 721 and 723 are "no"), coefficient-dependent offset correction process 710 is complete. In operation, coefficient offset correction circuitry 600 can then apply coefficient-dependent offset correction to the weighted tap values output by coefficient gain stages 410, 412, 414, 416 in this example, as signals are received and filtered by receiver 200. Accordingly, this implementation enables improvement in the instantaneous BER of receiver 200.

Furthermore, the derivation of offset correction values as stored in LUTs 610, 612, 614, 616 as a result of coefficient-dependent offset correction process 710 can enable further offset correction in receiver 200, specifically correction for offset in buffers 402 of delay stages 310, 312, 314, 316 of FFE 306 shown in FIG. 4. According to an implementation, correction for buffer offset can be applied by coefficient offset correction circuitry 600 by way of offset correction process 730 of FIG. 7. It is to be understood that offset correction process 730 is optional, and need not be performed, for example if the residual offset following coefficient-dependent offset correction process 710 is tolerable.

In this implementation, offset correction process 730 begins in process 732 with the selection of the first delay stage of the FFE, which is that delay stage associated with the most recent incoming sample. For the example of FFE 306 of FIG. 3 and FIG. 4, delay stage 310 is associated with the most recent incoming sample, which in this example is sample n−1, and is thus the first delay stage of FFE 306 and is selected in process 732.

Referring to the example of FFE 304, the input to buffer 402 in delay stage 310 selected in process 732 in this first pass of this example is zeroed (e.g., differential input lines are shorted) in process 734, such that the output of that buffer 402 of delay stage 310 as presented on tap 310T is the offset (if any) introduced by buffer 402 itself. Also in process 734, the output of buffer 402 in each of the succeeding delay stages 312, 314, 316 in FFE 304 is zeroed (e.g., differential output lines are shorted). As a result, tap 310T is the only potential non-zero tap value in FFE 304. In process 736, the tap weight applied by coefficient gain stage 410 to tap 310T is set at its maximum value. The tap weights of the other coefficient gain stages 412, 414, 416 do not participate as the values of their associated taps 312T, 314T, 316T are at zero following process 734. These tap weights at coefficient gain stages 412, 414, 416 may be maximized at this point in process 730, if desired, in anticipation of later iterations.

The output of coefficient gain stage 410 thus presents the offset of buffer 402 of delay stage 310, amplified by its maximum tap weight as applied by coefficient gain stage 410. Because the output of coefficient gain stage 410 is the only potential non-zero input to summing circuit 420, the output of summing circuit 420 at this point will provide an indication of the offset introduced by buffer 402 of this first selected delay stage 310, and is observed by offset compensation accumulator and logic circuitry 450 in process 738. Furthermore, because this buffer offset correction process 730 is performed after coefficient-dependent offset correction process 710 has completed, the offset detected in process 738 will not include significant code-dependent offset, which will have been corrected in process 710. According to this implementation, offset compensation accumulator and logic circuitry 450 applies a correction to buffer 402 in delay stage 310 also in process 738, for example by adjusting a bias level, until the output of summing circuit 420 is zeroed to within a desired tolerance.

Following observation and correction process 738, decision 739 is then executed to determine whether additional buffers 402, in this example, remain to be corrected. If so (decision 739 is "yes"), process 740 is performed to advance to the next delay stage 312 in FFE 304, and process 730 is repeated from process 734, beginning with the shorting of the differential inputs at buffer 402 in delay stage 312 and maintaining the shorting at the outputs of buffers 402 in succeeding delay stages 314, 316. Buffer offset correction process 730 then continues in the same manner for each of the succeeding buffers 402 in FFE 304, until no more buffers remain to be offset corrected (decision 739 is "no"), at which point offset correction according to this implementation ends.

As evident from the foregoing description, buffer offset correction process 730 proceeds in order by delay stage from the first (most recent sample position) to the last. This ordering of buffer offset correction enables the buffer offset correction applied to later delay stages to correct the residual offset of previous buffers that was not fully corrected.

Following the performance of coefficient-dependent offset correction process 710, and (if performed) buffer offset correction process 730, the offset correction of FFE 304 in receiver 200 is complete. Signal traffic received at receiver 200 may then be processed.

Referring back to FIG. 6, coefficient offset correction circuitry 600 operates during the receipt of signal traffic by applying the FFE coefficients for each tap 310T, 312T, 314T, 316T to the corresponding addressing circuits 620, 622, 624, 626, respectively. These FFE coefficients will have been derived for FFE 304 during adaptation of the filters in receiver 200. In response to receiving those coefficient values, addressing circuits 620, 622, 624, 626 will access their respective LUTs 610, 612, 614, 616 to retrieve the stored offset correction values associated with the adapted coefficient values. These retrieved offset correction values from LUTs 610, 612, 614, 616 are summed at summing circuit 630, descaled by descale function 435, and applied to summing circuit 642 in summer offset correction circuitry 460, for eventual application to summing circuit 420 as an offset correction (e.g., by modulating a bias current or voltage in summing circuit 420). If the coefficient values for the FFE taps change, such as from an adaptation update during operation, the offset correction will change accordingly. As such, a code-dependent offset correction is enabled by this embodiment.

As shown in the example embodiment of FIG. 6, summing circuit 642 in summer offset correction circuitry 460 receives another input from summer background offset correction circuit 644. According to another example, summer background offset correction circuit 644 may be provided to correct for drift of offset in receiver 200 that can occur over time, especially as operational or environmental conditions change for either the transmission channel or at receiver 200 itself. In this example, summer background offset correction circuit 644 may be implemented as part of offset compensation accumulator and logic circuitry 450, or in other circuitry implemented in receiver 200.

Figure 8C:
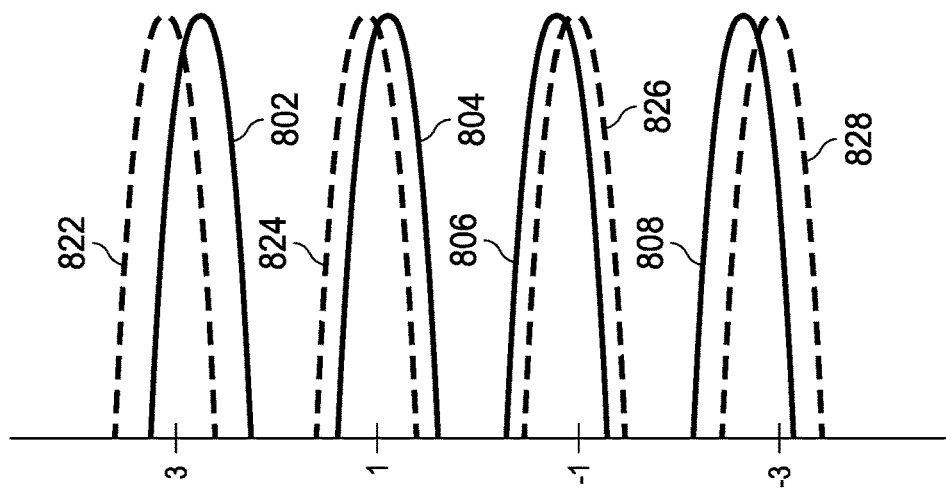
FIG. 8A, FIG. 8B, and FIG. 8C are plots of filtered sample distributions according to a PAM4 modulation, illustrating effects of offset and gain drift as may be corrected according to an implementation.
Figure 8B:
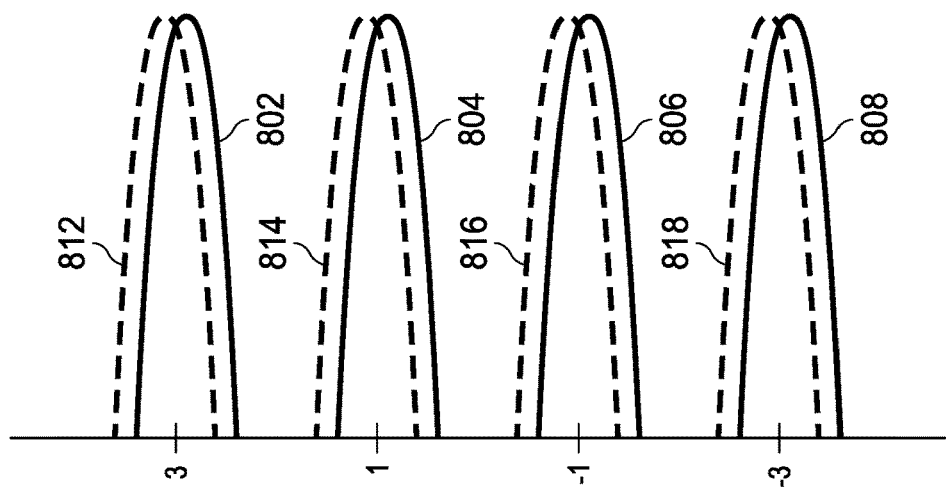
Figure 8A:
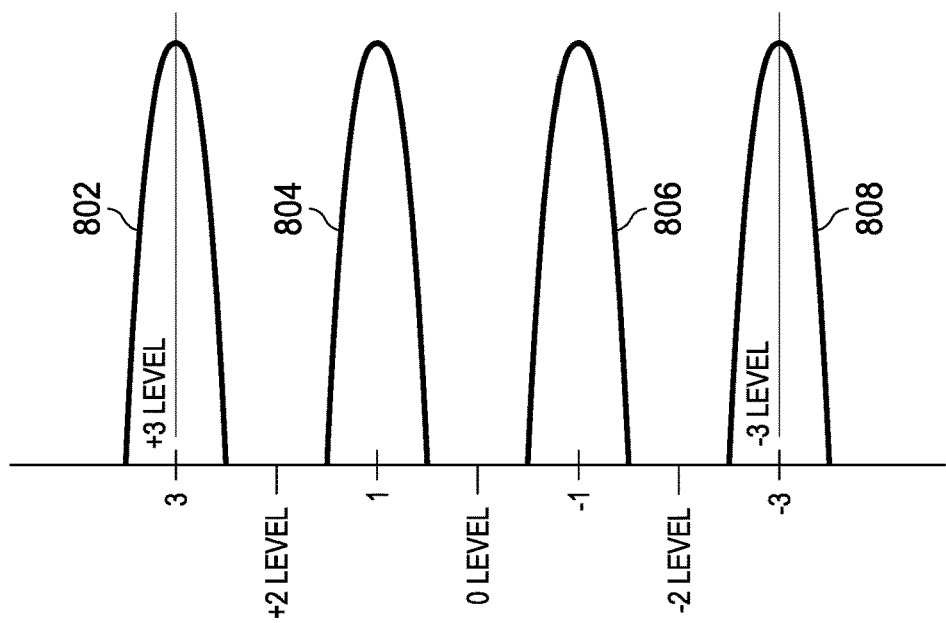

FIG. 8A illustrates the operation of comparators 430, 432, 434 of FIG. 4 in "slicing" the weighted sum at the output of summing circuit 420 to distinguish the symbol values in a PAM4 modulation, as used in this example. As described above, comparator 430 compares the weighted sum with a "0" reference value (e.g., a reference voltage corresponding to a "0" level) to determine whether it represents a positive value (+1 or +3) or a negative value (−1 or −3). Comparator 432 compares positive weighted sums with a "+2" reference value (e.g., a reference voltage corresponding to a "+2" level) to determine whether a +1 (binary 10) or +3 (binary 11) value is represented, while comparator 434 compares negative weighted sums with a "−2" reference value (e.g., a reference voltage corresponding to a "−2" level) to determine whether a −1 (binary 01) or −3 (binary 00) value is represented. Due to the lossy transmission channel, and despite the signal conditioning in receiver 200, each symbol value in the constellation will exhibit a distribution of signal values, as shown in FIG. 8A by curves 802 (for the +3 symbol value), 804 (for +1), 806 (for −1), and 808 (for −3). In this example of FIG. 8A, each of curves 802, 804, 806, 808 are generally centered at their appropriate analog levels.

FIG. 8B illustrates an example in which offset drift in receiver 200, such as at summing circuit 420, has occurred. As shown in FIG. 8B, each of the distributions of signal values has shifted in a positive direction, as exhibited by curves 812 (for the +3 symbol value), 814 (for +1), 816 (for −1), and 818 (for −3), which are shown relative to the curves 802, 804, 806, 808, respectively, for those same symbol values that are centered at the proper levels. FIG. 8C illustrates an example in which gain drift has occurred in receiver 200. In this example, gain has drifted to a higher amplitude, as shown by curves 822 (for +3) and 824 (for +1) shifting in a positive direction relative to their respective centered distributions 802, 804, while curves 826 (for −1) and 828 (for −3) have shifted in a negative direction relative to their respective centered distributions 806, 808.

According to an example embodiment, summer background offset correction circuit 644 may also be provided in some embodiments to detect and correct for this drift in offset and gain. In an example in which summer background offset correction circuit 644 is provided as part of compensation accumulator and logic circuitry 450, and receives inputs from each of comparators 430 432, 434, 435 (as shown in FIG. 4). According to this example, these inputs include indications from error comparator 435 indicating, for each output symbol having a +3 or −3 value, whether the weighted sum for that symbol exceeds the +3 level in a positive direction or exceeds the −3 level in a negative direction.

Figure 9:
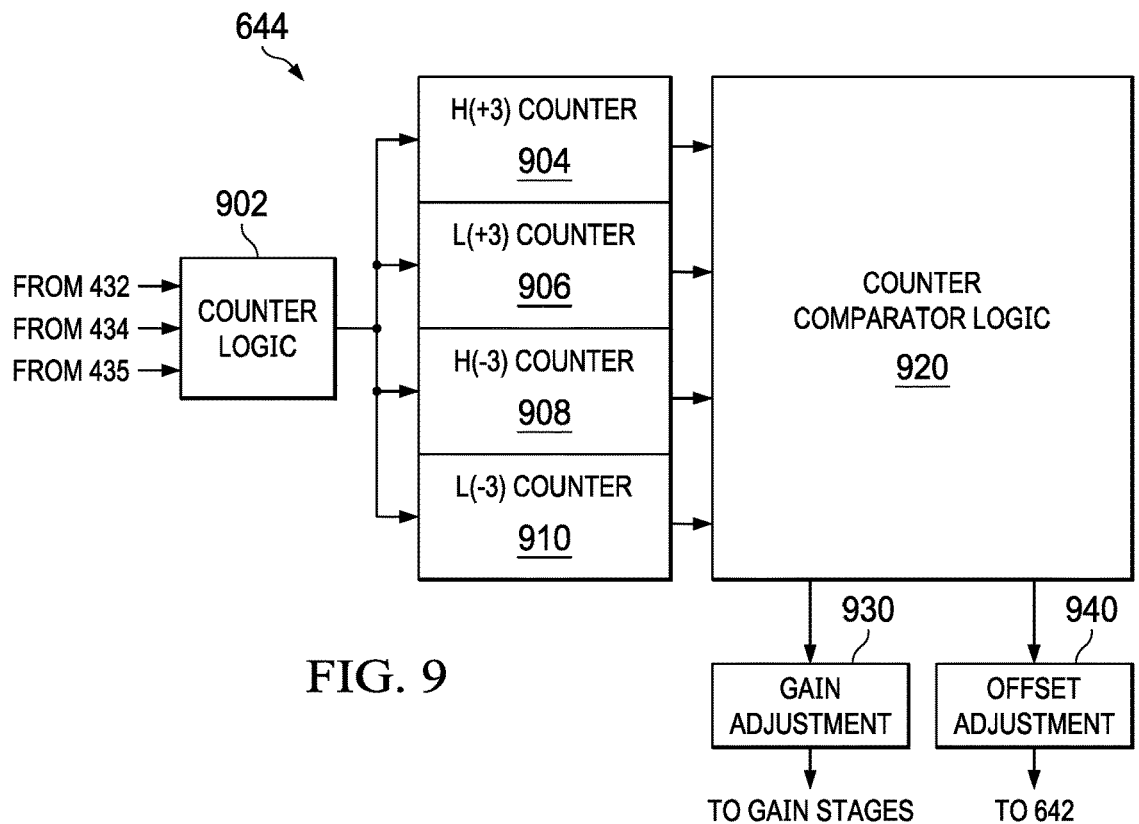
FIG. 9 is an electrical diagram, in block form, of summer background offset correction circuitry according to an implementation.

FIG. 9 illustrates an example architecture of summer background offset correction circuit 644. Summer background offset correction circuit 644 includes counter logic 902 having inputs coupled to comparators 432, 434, 435 in slicer 322. Comparators 432, 434 detect symbol values of +3 and −3, respectively, as described above. In this example, error comparator 435 indicates to counter logic 902 whether the weighted sum at the output of summing circuit 420, if corresponding to either a +3 or −3 symbol value, exceeds the +3 or −3 level, respectively. The operation of counter logic 902 will be described below. Counter logic 902 has outputs applied to corresponding clock inputs of counters 904, 906, 908, 910, which advance their count in response to signal from counter logic 902. Counters 904, 906, 908, 910, have outputs on which each can present its contents to comparator logic 920. As will be described below, counter comparator logic 920 considers the counts of counters 904, 906, 908, 910 in determining whether to adjust the gain or offset of receiver 200, and as such has outputs coupled to gain adjustment circuit 930 and offset adjustment circuit 940.

Figure 10:
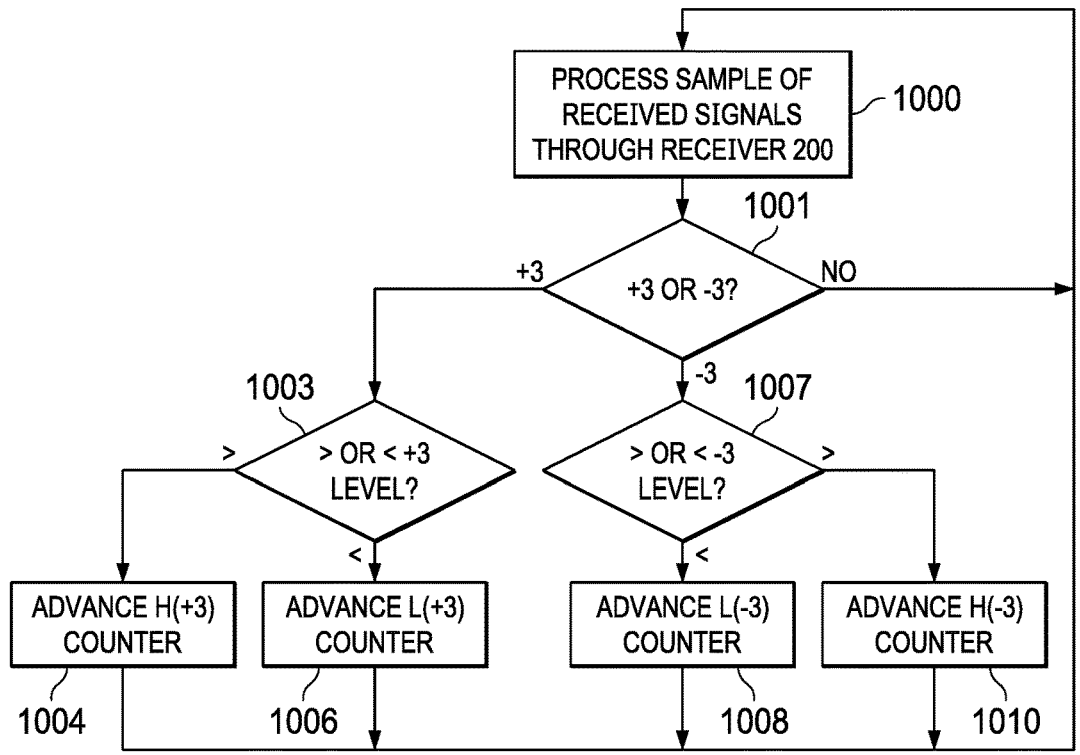
FIG. 10 is a flow diagram illustrating a method of performing summer background offset correction according to an implementation.

FIG. 10 illustrates the operation of counter logic 902 of summer background offset correction circuit 644 according to an example. Summer background offset correction circuit 644 can operate in the background during normal operation of receiver 200, while receiver 200 is processing samples of received signals in process 1000 of FIG. 10. Upon slicer 322 determining the symbol value for a received sample, counter logic 902 examines results from the +2 and −2 slicers 432, 434 to determine whether the symbol value for that sample is a +3 or a −3. If neither (decision 1001 is "no"), counter logic 902 takes no action and awaits processing of the next sample.

In response to slicer 432 indicating that the symbol value for the received sample is a +3 value (decision 1001 is "+3"), counter logic 902 next examines the input received from error comparator 435 in decision 1003 to determine whether the weighted sum at the output of summing circuit 420 is above or below the +3 level. If above the +3 level, counter logic 902 advances the contents of H(+3) counter 904; if below the +3 level, counter logic 902 advances the contents of L(+3) counter 906. Similarly, in response to slicer 432 indicating that the symbol value for the received sample is a −3 value (decision 1001 is "−3"), counter logic 902 next examines the input received from error comparator 435 in decision 1007 to determine whether the weighted sum at the output of summing circuit 420 is above (less negative than) or below (more negative than) the −3 level. If above the −3 level, counter logic 902 advances the contents of H(−3) counter 904; if below the −3 level, counter logic 902 advances the contents of L(−3) counter 906. In either case, processing by counter logic 902 for this sample is complete, and counter logic awaits processing of the next sample. The contents of counters 904, 906, 908, 910 continue advancing in this fashion as symbols continue to be processed by receiver 200.

Figure 11:
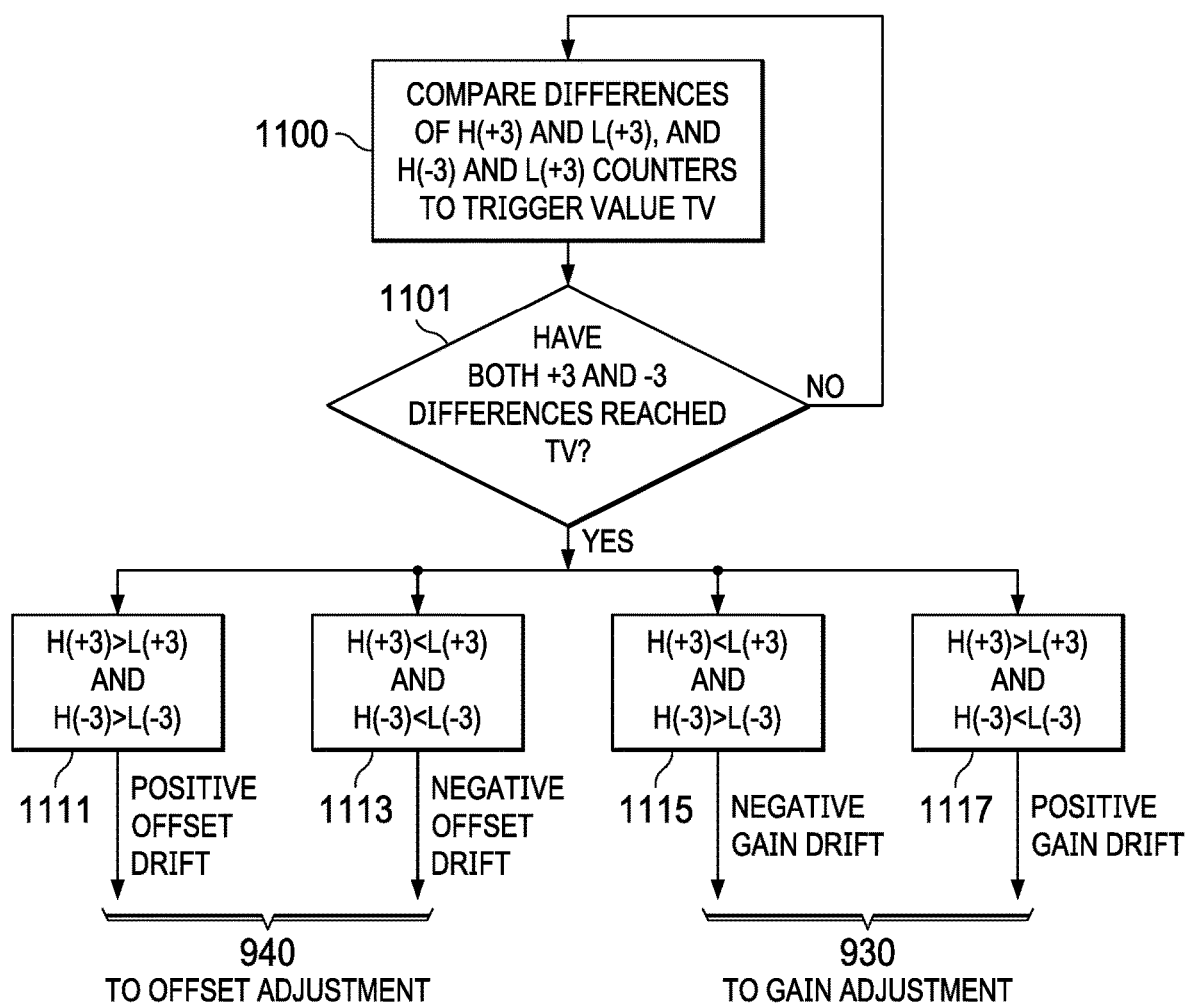
FIG. 11 is a flow diagram illustrating an example of the operation of counter comparator logic in the summer background offset correction circuitry according to an implementation.
Figure 12:
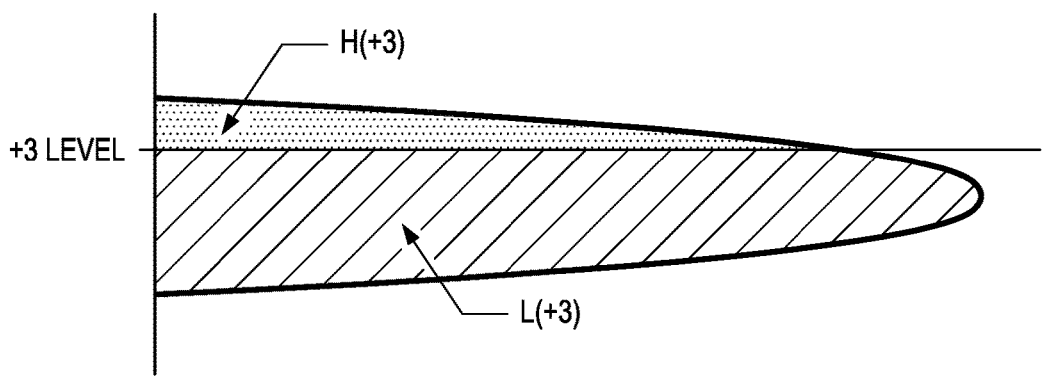
FIG. 12 is a plot illustrating a shifted distribution at a +3 level in a PAM4 modulation.

FIG. 11 illustrates the operation of counter comparator logic 920 according to an example. In process 1100, counter comparator logic 920 analyzes the contents of counters 904, 906, 908, 910, specifically by determining the number of differences between the contents in each counter pair and comparing those differences against a trigger value. For this example using PAM4 modulation, counter comparator logic 920 in process 1100 determines the difference between the contents of H(+3) counter 904 and L(+3) counter 906, and the difference between the contents of H(−3) counter 904 and L(−3) counter 906. Also in process 1100, counter comparator logic 920 compares both of those differences with a trigger value TV, as may be determined in advance according to the desired responsiveness with which offset and gain drift are to be corrected. For example, counter comparator logic 920 performs the comparisons:

$$|H(+3)-L(+3)|>TV$$

$$|H(-3)-L(+3)|>TV$$

where H(+3) represents the contents of counter 904, L(+3) represents the contents of counter 906, H(−3) represents the contents of counter 908, and L(−3) represents the contents of counter 910. As shown in FIG. 12 for the example of the +3 level, the contents H(+3) of counter 904 represent the distribution of weighted sums corresponding to a +3 symbol value that are greater than the ideal +3 level, and the contents L(+3) of counter 906 represent the distribution of weighted sums corresponding to a +3 symbol value that are less than the ideal −3 level. In this example of FIG. 12, execution of process 1100 would detect a difference between the L(+3) and H(+3) contents, indicating the negative shift of the distribution of weighted sums for the +3 symbol.

In decision 1101, counter comparator logic 920 determines whether both differences evaluated in process 1100 exceed the trigger value TV. If not (decision 1101 is "no"), counter comparator logic 920 takes no action toward adjusting gain or offset, and continues to monitor the contents of counters 904, 906, 908, 910 in process 1100.

If both differences evaluated in process 1100 exceed the trigger value TV (decision 1101 is "yes"), counter comparator logic 920 has detected that adjustment of either gain or offset is indicated. To determine which adjustment action is to be performed, counter comparator logic 920 detects one of four conditions 1111, 1113, 1115, 1117 by evaluating the differences determined in process 1100, specifically by evaluating the polarity of the differences that exceed the trigger value.

Condition 1111 detected by counter comparator logic 920 corresponds to the H(+3) contents of counter 904 being greater than the L(+3) contents of counter 906, and the H(−3) contents of counter 908 being greater than the L(−3) contents of counter 910. This condition 1111 indicates that the weighted sum distributions have shifted in a positive direction, such as shown in the example of FIG. 8B, as caused by a positive offset drift. Conversely, condition 1113 detected by counter comparator logic 920 corresponds to the H(+3) contents of counter 904 being less than the L(+3) contents of counter 906, and the H(−3) contents of counter 908 being less than the L(−3) contents of counter 910. This condition 1113 indicates that the weighted sum distributions have shifted in a negative direction, as caused by a negative offset drift. In the case of either of conditions 1111, 1113, counter comparator logic 920 forwards a signal to offset adjustment circuit 940, which in turn applies a corresponding offset correction to summing circuit 642 (FIG. 6). Summing circuit 642 adds this offset correction to the code-dependent offset correction presented by descale function 635 and produces an offset correction value sum_corr to summing circuit 420 for application prior to slicing.

Referring back to FIG. 11, condition 1115 detected by counter comparator logic 920 corresponds to the H(+3) contents of counter 904 being less than the L(+3) contents of counter 906, and the H(−3) contents of counter 908 being greater than the L(−3) contents of counter 910. This condition 1115 indicates that the weighted sum distributions have squeezed toward the 0 level from both the +3 and −3 sides, as caused by a negative gain drift. Conversely, condition 1117 detected by counter comparator logic 920 corresponds to the H(+3) contents of counter 904 being greater than the L(+3) contents of counter 906, and the H(−3) contents of counter 908 being less than the L(−3) contents of counter 910. This condition 1117 indicates that the weighted sum distributions have expanded away from the 0 level from both sides as caused by a positive gain drift. FIG. 8C illustrates an example of this positive gain drift as may be indicated by condition 1117. In the case of either of conditions 1115, 1117, counter comparator logic 920 forwards a signal to the appropriate gain stages for adjustment of the gain applied at the appropriate place or places in the receive path to correct for this gain drift.

According to this example, drift in offset and gain can be efficiently and accurately corrected during the processing of received traffic. For example, the use of differences in the distribution of weighted sums at the +3 and −3 levels for PAM4 modulation reduces bias in the offset estimate that may be caused by data dependent wandering. Further, the background offset correction according to this example is not triggered by the processing of a fixed number of samples, but rather may be triggered only by offset building to a sufficient extent as to be observable. In addition, the triggering of background offset correction in response to both a distribution shift at the +3 level reaching a trigger value and a distribution shift at the −3 level reaching the trigger level ensures that offset correction is not applied in response to DC input levels. Incorporation of this optional background offset correction into the overall operation of receiver 200 can therefore provide additional benefits.

The implementations described above enable precise and efficient correction of code-dependent offset in a receiver using analog circuitry to implement discrete-time filtering is provided. Such error correction can further enable reduction in the effects of DC baseline wander that can be the result of finite data accumulation in DC offset correction, such wander effectively creating a high pass filter having the effect of closing eye height, which is especially problematic in complex modulation schemes such as PAM4. Further implementations address correction of offset in delay chain buffers, and background offset correction that is triggered as sufficient mismatch is evident for both high and low symbol values.

The term "couple", as used herein, may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A. A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection" and "pin" are used interchangeably. Unless specifically stated to the contrary, these terms are generally used to mean an interconnection between or a terminus of a device element, a circuit element, an integrated circuit, a device or other electronic or semiconductor component.

Unless otherwise stated, "about," "approximately," or "substantially" preceding a value means +/−10 percent of the stated value. Modifications are possible in the described examples, and other examples are possible within the scope of the claims.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description.

While one or more embodiments have been described in this specification, it is of course contemplated that modifications of, and alternatives to, these embodiments, such modifications and alternatives capable of obtaining one or more the advantages and benefits of this invention, will be apparent to those of ordinary skill in the art having reference to this specification and its drawings. It is contemplated that such modifications and alternatives are within the scope of the claims presented herein.

What is claimed is:

1. A receiver circuit, comprising:
    an equalizer, comprising:
        a plurality of delay stages, each storing one in a sequence of input samples;
        a plurality of coefficient gain stages, each associated with and having an input coupled to one of the plurality of delay stages, and each comprising a plurality of differential amplifiers selectable responsive to a selected coefficient value; and
        a first summing circuit, having a plurality of inputs, each coupled to an output of one of the plurality of coefficient gain stages;
    a slicer, having an input coupled to an output of the first summing circuit; and
    offset correction circuitry, comprising:
        memory arranged as a plurality of look-up tables (LUTs), each LUT associated with one of the coefficient gain stages, each LUT storing a plurality of offset correction values that are each associated with a coefficient value at the associated coefficient gain stage;
        addressing circuitry, for accessing the plurality of LUTs to select offset correction values corresponding to current coefficient values at the associated coefficient gain stages; and
        a second summing circuit, for adding the selected offset correction values from the plurality of LUTs, the second summing circuit having an output coupled to an input of the first summing circuit.

2. The receiver circuit of claim 1, wherein the equalizer is a feed-forward equalizer.

3. The receiver circuit of claim 1, wherein the offset correction circuitry further comprises:
    a descale function, having an input coupled at the output of the second summing circuit, for multiplying a sum of the selected offset correction values from the plurality of LUTs by a descale factor;
    and wherein the output of the descale function is coupled to the input of the first summing circuit.

4. The receiver circuit of claim 1, wherein the slicer comprises:
    a plurality of comparators detecting amplitudes at the output of the first summing circuit to quantize each detected amplitude to one of a plurality of levels; and
    an error comparator, for determining whether a detected amplitude quantized to either an extreme high level or an extreme low level is greater than or less than that extreme high level or extreme low level;
    wherein the offset correction circuitry further comprises:
        a first counter, for counting instances of the detected amplitude at the extreme high level being above the extreme high level;
        a second counter, for counting instances of the detected amplitude at the extreme high level being below the extreme high level;
        a third counter, for counting instances of the detected amplitude at the extreme low level being above the extreme low level;
        a fourth counter, for counting instances of the detected amplitude at the extreme low level being below the extreme low level;
        counter comparator logic, adapted to:
            determine whether both a difference in the contents of the first and second counters and a difference in the contents of the third and fourth counters have reached a trigger value; and
            responsive to both differences exceeding the trigger value, providing an adjustment to the equalizer.

5. The receiver circuit of claim 4, wherein the counter comparator logic is adapted to provide the adjustment to the equalizer by:
    responsive to either the contents of the first counter being greater than the contents of the second counter and the contents of the third counter being greater than the contents of the fourth counter, or the contents of the first counter being less than the contents of the second counter and the contents of the third counter being less than the contents of the fourth counter, applying an offset correction to the output of the first summing circuit; and
    responsive to either the contents of the first counter being less than the contents of the second counter and the contents of the third counter being greater than the contents of the fourth counter, or the contents of the first counter being greater than the contents of the second counter and the contents of the third counter being less than the contents of the fourth counter, applying a gain correction to the equalizer.

6. The receiver circuit of claim 1, wherein the equalizer is a feed-forward equalizer;
and further comprising:
a continuous-time equalizer coupled between an input of the receiver and an input of the feed-forward equalizer, and adapted to apply a continuous-time filter to signals received at the input of the receiver.

7. The receiver circuit of claim 1, wherein the equalizer is a feed-forward equalizer;
and further comprising:
a decision feedback equalizer, having an input coupled to the output of the slicer and an output coupled to an input of the first summing circuit.

8. The receiver circuit of claim 1, further comprising:
adaptation logic, for determining the selected coefficient values applied to the plurality of coefficient gain stages in the feed-forward equalizer; and
control logic circuitry for storing, in the plurality of LUTs, the offset correction values associated with the selected coefficient values.

9. The receiver circuit of claim 1, wherein the control logic circuitry is adapted to store the offset correction values by performing a plurality of operations comprising:
zeroing all inputs to the coefficient gain stages;
selecting one of the coefficient gain stages;
applying a zero coefficient value to coefficient gain stages other than the selected coefficient stage;
performing, for each of a plurality of available coefficient values at the selected coefficient gain stage, a plurality of operations comprising:
applying the coefficient value to the selected coefficient gain stage;
detecting an offset at the output of the first summer circuit; and
storing, in the LUT associated with the selected coefficient gain stage at an entry corresponding to the selected coefficient value, an offset correction value corresponding to the detected offset at the output of the first summer circuit; and
repeating the selecting, applying, and performing operations for each of the plurality of coefficient gain stages.

10. The receiver circuit of claim 9, wherein the offset correction circuitry further comprises:
a descale function, having an input coupled at the output of the second summing circuit, for descaling a sum of the selected offset correction values from the plurality of LUTs by a scaling factor;
wherein the output of the descale function is coupled to the input of the first summing circuit;
and wherein the storing step stores an offset correction value corresponding to the detected offset at the output of the first summer circuit at a higher resolution by the scaling factor than a resolution of the sum of the selected offset correction values.

11. A method of correcting offset in an equalizer including a plurality of delay stages storing a sequence of input samples, a plurality of coefficient gain stages associated with corresponding ones of the plurality of delay stages and comprising a plurality of differential amplifiers selectable responsive to a selected coefficient value, and a summing circuit summing the output of the differential amplifiers, the method comprising the steps of:
at each of a plurality of look-up tables (LUTs) in memory, each LUT associated with one of the coefficient gain stages, retrieving an offset correction value stored in association with the selected coefficient value for that coefficient gain stage;
summing the offset correction values from the plurality of LUTs; and
applying an offset correction to an input of the summing circuit, the offset correction corresponding to the summed offset correction values from the plurality of LUTs.

12. The method of claim 11, further comprising:
storing, in each of the LUTs, an offset correction value for each of a plurality of coefficient values available for the coefficient gain stage associated with that LUT.

13. The method of claim 12, wherein the storing step comprises:
zeroing all inputs to the coefficient gain stages;
selecting one of the plurality of coefficient gain stages;
applying a zero coefficient value to coefficient gain stages other than the selected coefficient gain stages;
performing, for each of a plurality of available coefficient values at the selected coefficient gain stage, a plurality of operations comprising:
operating the selected coefficient gain stage at a gain corresponding to the coefficient value;
detecting an offset at the output of the summer circuit; and
storing, in the LUT associated with the coefficient gain stage at an entry corresponding to the coefficient value, an offset correction value corresponding to the detected offset at the output of the summing circuit; and
repeating the selecting, applying, and performing steps for each of the plurality of coefficient gain stages.

14. The method of claim 13, wherein the storing step stores an offset correction value corresponding to the detected offset at a higher resolution by a scaling factor than a resolution of the summed offset correction values from the plurality of LUTs;
and wherein the method further comprises:
descaling the summed offset correction values by the scaling factor.

15. The method of claim 12, wherein the sequence of input samples corresponds to a sequence of symbols transmitted at more than two amplitudes representing more than two symbol values;
wherein an output of the summing circuit is coupled to a slicer comprising a plurality of comparators to quantize each detected amplitude to one of a plurality of levels;
the method further comprising, after the storing step:
counting a first count of instances of the detected amplitude at the extreme high level being above the extreme high level;
counting a second count of instances of the detected amplitude at the extreme high level being below the extreme high level;
counting a third count of instances of the detected amplitude at the extreme low level being above the extreme low level;
counting a fourth count of instances of the detected amplitude at the extreme low level being below the extreme low level;
determining whether both a difference in the first and second counts and a difference in the third and fourth counts have reached a trigger value; and
responsive to both differences exceeding the trigger value, providing an adjustment to the equalizer.

16. The method of claim 15, wherein the step of providing an adjustment comprises:
responsive to either the first count being greater than the second count and the third count being greater than the fourth count, or the first count being less than the second count and the third count being less than the fourth count, applying an offset correction to the output of the first summing circuit; and responsive to either the first count being less than the second count and the third count being greater than the fourth count, or the first count being greater than the second count and the third count being less than the fourth count, applying a gain correction to the equalizer.

17. The method of claim 12, wherein the plurality of delay stages is arranged in a sequence and each delay stage comprises a buffer storing an input sample in the sequence; and further comprising, after the storing step:

selecting the first delay stage in the sequence;

zeroing an input of the buffer in the selected delay stage;

zeroing outputs of the buffers in each of the others of the plurality of delay stages;

applying a maximum coefficient value at the coefficient gain stage associated with the selected delay stage;

correcting offset at the buffer in the selected delay stage; and repeating the zeroing, applying, and correcting steps for each of the remaining plurality of delay stages, taken in sequence.

18. A receiver circuit, comprising:

an equalizer, comprising:

a plurality of delay stages, each storing one in a sequence of input samples;

a plurality of coefficient gain stages, each associated with and having an input coupled to one of the plurality of delay stages, and each comprising a plurality of differential amplifiers selectable responsive to a selected coefficient value; and a first summing circuit, having a plurality of inputs, each coupled to an output of one of the plurality of coefficient gain stages; and offset correction circuitry, comprising:

memory arranged as a plurality of look-up tables (LUTs), each LUT associated with one of the coefficient gain stages, each LUT storing a plurality of offset correction values that are each associated with a coefficient value at the associated coefficient gain stage;

addressing circuitry, for accessing the plurality of LUTs to select offset correction values corresponding to current coefficient values at the associated coefficient gain stages; and a second summing circuit, for adding the selected offset correction values from the plurality of LUTs, the second summing circuit having an output coupled to an input of the first summing circuit.

* * * * *